(12) United States Patent
Bayang et al.

(10) Patent No.: US 7,391,585 B1
(45) Date of Patent: Jun. 24, 2008

(54) METHOD FOR REDUCING OCCURRENCES OF TAPE STICK CONDITIONS IN MAGNETIC TAPE

(75) Inventors: Josephine F. Bayang, Tucson, AZ (US); Nhan X. Bui, Tucson, AZ (US); Ernest S. Gale, Tucson, AZ (US); Eiji Ogura, Kanagawa-ken (JP); Kazuhiro Tsuruta, Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 58 days.

(21) Appl. No.: 11/619,101

(22) Filed: Jan. 2, 2007

(51) Int. Cl.
*G11B 15/18* (2006.01)
*G11B 15/20* (2006.01)
*G11B 15/43* (2006.01)

(52) U.S. Cl. .................. 360/69; 360/71; 360/74.1; 360/75

(58) Field of Classification Search .............. None
See application file for complete search history.

(56) References Cited

U.S. PATENT DOCUMENTS

| | | | |
|---|---|---|---|
| 4,015,799 A | | 4/1977 | Koski et al. |
| 4,125,881 A | | 11/1978 | Eige et al. |
| 4,466,027 A | * | 8/1984 | Howell et al. ............. 360/66 |
| 4,523,133 A | | 6/1985 | Messenger ................ 360/71 |
| 4,559,571 A | * | 12/1985 | Olmsted et al. ......... 360/251.3 |
| 4,951,161 A | | 8/1990 | Suzuki et al. ............. 360/71 |
| 5,101,311 A | * | 3/1992 | Richmond ................ 360/69 |
| 5,294,791 A | * | 3/1994 | Pahr ................... 360/77.12 |
| 5,313,343 A | | 5/1994 | Yatomi |
| 5,327,304 A | | 7/1994 | Owada et al. |
| 5,367,471 A | * | 11/1994 | Nguyen et al. .......... 360/74.3 |
| 5,463,506 A | | 10/1995 | Mitsuyasu et al. |
| 5,576,905 A | | 11/1996 | Garcia et al. |
| 5,923,494 A | * | 7/1999 | Arisaka et al. ............. 360/75 |
| 5,995,331 A | * | 11/1999 | Kunze et al. ............ 360/251.3 |
| 6,493,167 B2 | * | 12/2002 | Kobayashi et al. ........ 360/72.3 |

FOREIGN PATENT DOCUMENTS

JP            10188387 A    *   7/1998

OTHER PUBLICATIONS

"Unsticking a Magnetic Tape from a Magnetic Head," May 1972, IBM TDB vol. 14, No. 12, p. 3674.*

* cited by examiner

*Primary Examiner*—Hoa T. Nguyen
*Assistant Examiner*—James L Habermehl
(74) *Attorney, Agent, or Firm*—Cantor Colburn LLP; Jennifer Anda

(57) ABSTRACT

Disclosed is a method for reducing occurrences of stick conditions in tape, the method including stopping rotation of a supply reel and take-up reel of a drive that includes a length of tape, a portion of the tape extending between the reels and contacting a head between the reels, wherein the stopping creates a stop condition in the drive, determining if the tape is stuck to the head, dropping tension in the tape between the reels, freeing the tape for movement in a z-direction via the dropping tension, moving the head in y-directions, moving the tape in an x-direction via a rotation of the supply reel a fraction of a rotation, and causing the tape to break contact with the head via the dropping, moving of the tape in the z-direction, moving of the tape in the x-direction, and/or moving of the head in the y-directions.

19 Claims, 3 Drawing Sheets

METHOD FOR REDUCING OCCURRENCES OF TAPE STICK CONDITIONS IN MAGNETIC TAPE

BACKGROUND OF THE INVENTION

1. Field of the Invention

The disclosure relates generally to a method for reducing occurrences of tape stick conditions in magnetic tape, and more particularly to a method for reducing occurrences of tape stick conditions in magnetic tape disposed in a reel-to-reel tape drive.

2. Description of Background

As linear and track densities are increased for magnetic tape in reel-to-reel tape drives, it becomes desirable to have smoother and smoother media. Smoother media leads to more frequent occurrences of adherence between the tape and magnetic heads of the drives, especially in humid conditions. This is caused by the "Jo-block" effect, wherein two smooth surfaces are rubbed against each other squeezing out any lubricating air interface and causing the two smooth surfaces to stick.

Once the tape sticks to the head, the drive tends to drop tension because it cannot move the tape. This leaves the drive with stuck or broken tape, which is an extremely undesirable condition to a user. Further, the sticking effect may be accentuated by thin media because of tighter head to tape conforming. Once stuck to the head, the risk to breaking the tape is very high. As such, it would be desirable to reduce occurrences of stick conditions between the tape and head of a reel-to-reel tape drive.

SUMMARY OF THE INVENTION

Disclosed is a method for reducing occurrences of tape stick conditions in magnetic tape, the method including stopping functional rotation of each of a bi-directionally rotatable supply reel and a bi-directionally rotatable take-up reel of a reel-to-reel tape drive that includes a length of magnetic tape at least partially wound around each of the reels, a portion of the length of tape extending between the reels and contacting a head positioned between the reels, wherein the stopping creates a stop condition in the tape drive, determining if the length of tape is stuck to the head, dropping tension in the length of tape extending between the reels from full tension to zero tension, freeing the length of tape for movement in a z-direction relative to the head via the dropping tension, the z-direction running substantially parallel to a deck of the tape drive and substantially orthogonal to the length of tape, moving the head in y-directions relative to the length of tape wherein the y-directions includes movement substantially toward and away from the deck of the tape drive, moving the length of tape in an x-direction relative to the head via a rotation of the bi-directionally rotatable supply reel a fraction of a reel rotation during the stop condition, and causing the portion of the length of tape to at least temporarily break contact with the head via at least one of the dropping, the moving of the length of tape in the z-direction, the moving of the length of tape in the x-direction, and the moving of the head in the y-directions.

Also disclosed is a method for reducing occurrences of tape stick conditions in magnetic tape, the method including stopping functional rotation of each of a bi-directionally rotatable supply reel and a bi-directionally rotatable take-up reel of a reel-to-reel tape drive that includes a length of magnetic tape at least partially wound around each of the reels, a portion of the length of tape extending between the reels and contacting a head positioned between the reels, wherein the stopping creates a stop condition in the tape drive, determining if the length of tape is stuck to the head, dropping tension in the length of tape extending between the reels from full tension to zero tension, freeing the length of tape for movement in a z-direction relative to head, the z-direction running substantially parallel to a deck of the tape drive and substantially orthogonal to the length of tape, moving the head in y-directions relative to the length of tape wherein the y-directions includes movement substantially toward and away from the deck of the tape drive, moving the length of tape in an x-direction relative to the head via a rotation of the bi-directionally rotatable supply reel a fraction of a reel rotation during the stop condition; and re-determining if the length of tape is stuck to the head.

A method for reducing occurrences of tape stick conditions in magnetic tape, the method including stopping functional rotation of each of a bi-directionally rotatable supply reel and a bi-directionally rotatable take-up reel of a reel-to-reel tape drive that includes a length of magnetic tape at least partially wound around each of the reels, a portion of the length of tape extending between the reels and contacting a head positioned between the reels, wherein the stopping creates a stop condition in the tape drive, determining if the length of tape is stuck to the head, dropping tension in the length of tape extending between the reels from full tension to zero tension, freeing the length of tape for movement in a z-direction relative to the head via the dropping tension, the z-direction running substantially parallel to a deck of the tape drive and substantially orthogonal to the length of tape, moving the head in y-directions relative to the length of tape wherein the y-directions includes movement substantially toward and away from the deck of the tape drive, moving the length of tape in an x-direction relative to the head via a rotation of the bi-directionally rotatable supply reel a fraction of a reel rotation during the stop condition, wherein the moving in the y-directions and the moving in the x-direction is simultaneous, and causing the portion of the length of tape to at least temporarily break contact with the head via at least one of the tension dropping, the moving of the length of tape in the z-direction, the moving the length of tape in the x-direction, and the moving of the head in the y-directions.

BRIEF DESCRIPTION OF THE DRAWINGS

The foregoing and other features and advantages of the present invention should be more fully understood from the following detailed description of illustrative embodiments taken in conjunction with the accompanying Figures in which like elements are numbered alike in the several Figures.

DETAILED DESCRIPTION OF THE INVENTION

Figure 1:
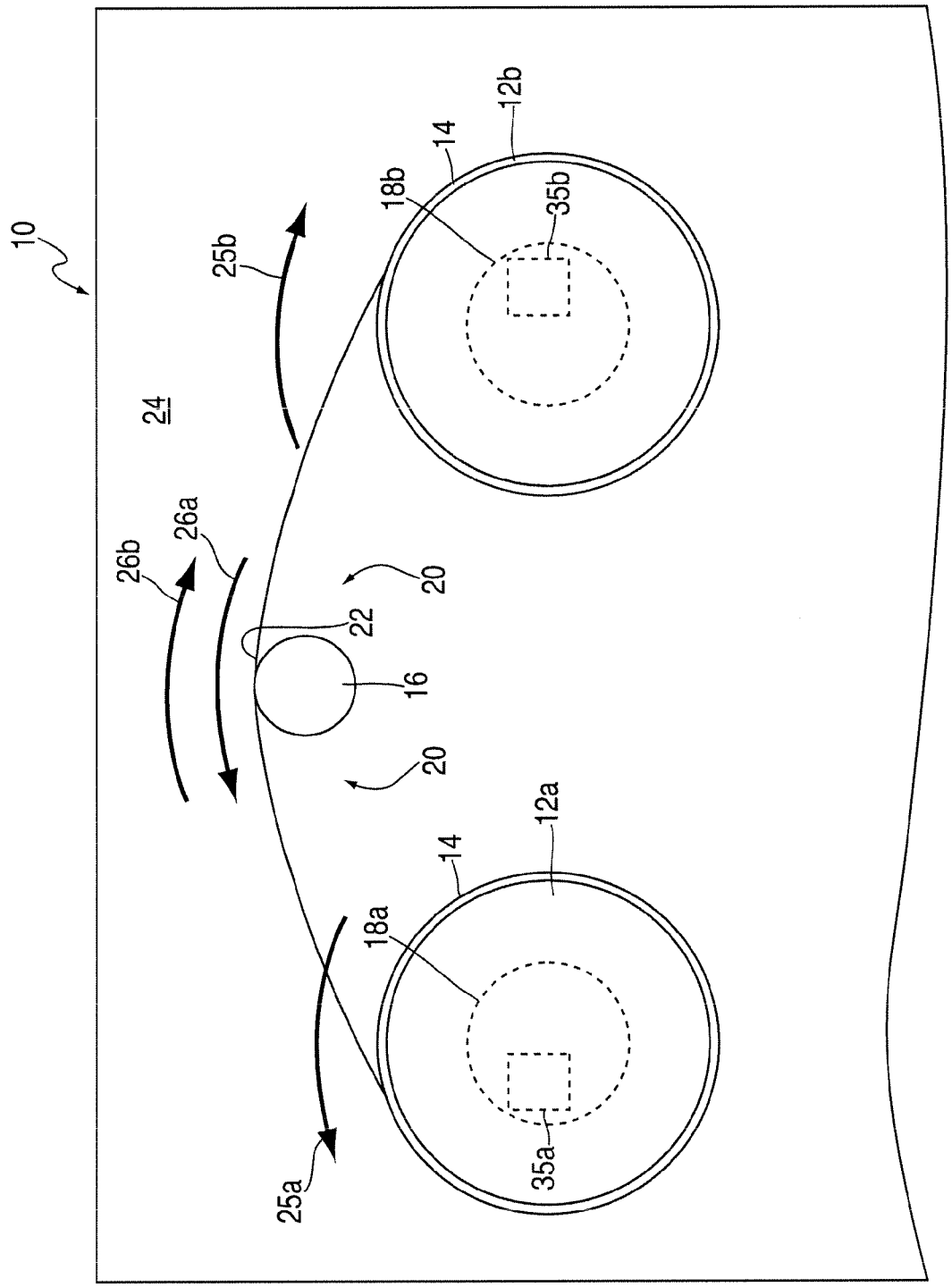
FIG. 1 is a schematic top view of a reel-to-reel tape drive.
Figure 2:
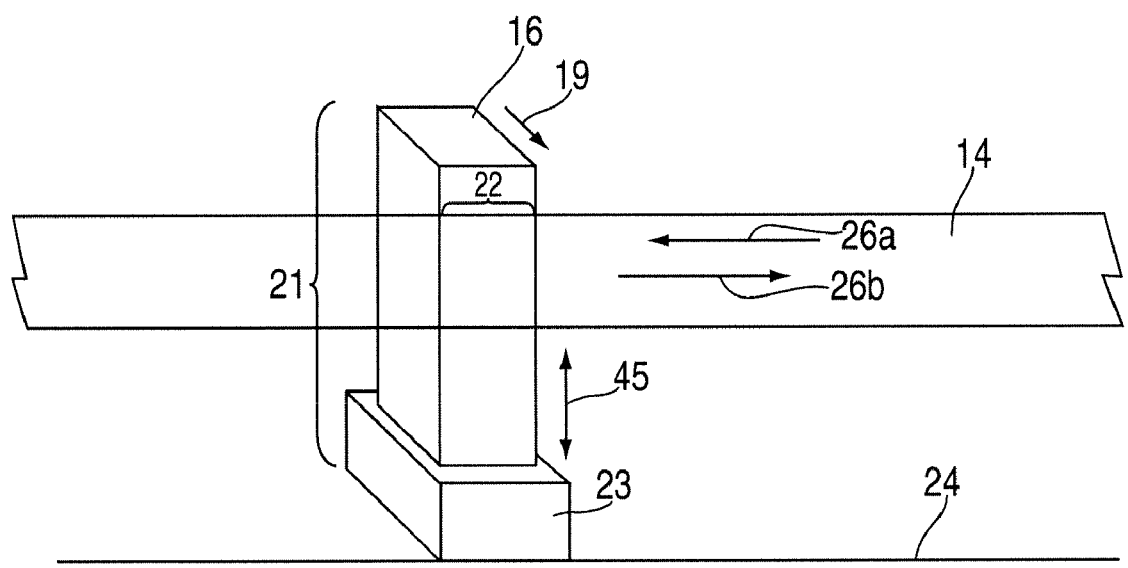
FIG. 2 is a partial, schematic side view of the reel-to-reel tape drive.

Referring to FIGS. 1 and 2, there is shown a reel-to-reel tape drive 10. The tape drive 10 includes a bi-directionally rotatable supply reel 12a, a bi-directionally rotatable take-up reel 12b, a length of magnetic tape 14, a head 16, and two motors 18a-b. The head 16 is disposed in a head region 20 between the two reels 12a-b. A portion 22 of the length of tape 14 consistently extends between the reels 12a-b across the head region 20. This portion 22 may be any portion of the length of tape 14, with the portion 22 illustrated in FIG. 1 representing a portion that extends across the region 20 while the drive 10 is experiencing a stop condition (described in greater detail later in the disclosure). The portion 22 contacts the head 16 within the head region 20. During operation of the drive 10, the head 16 reads/writes on the tape via this contact.

Figure 3:
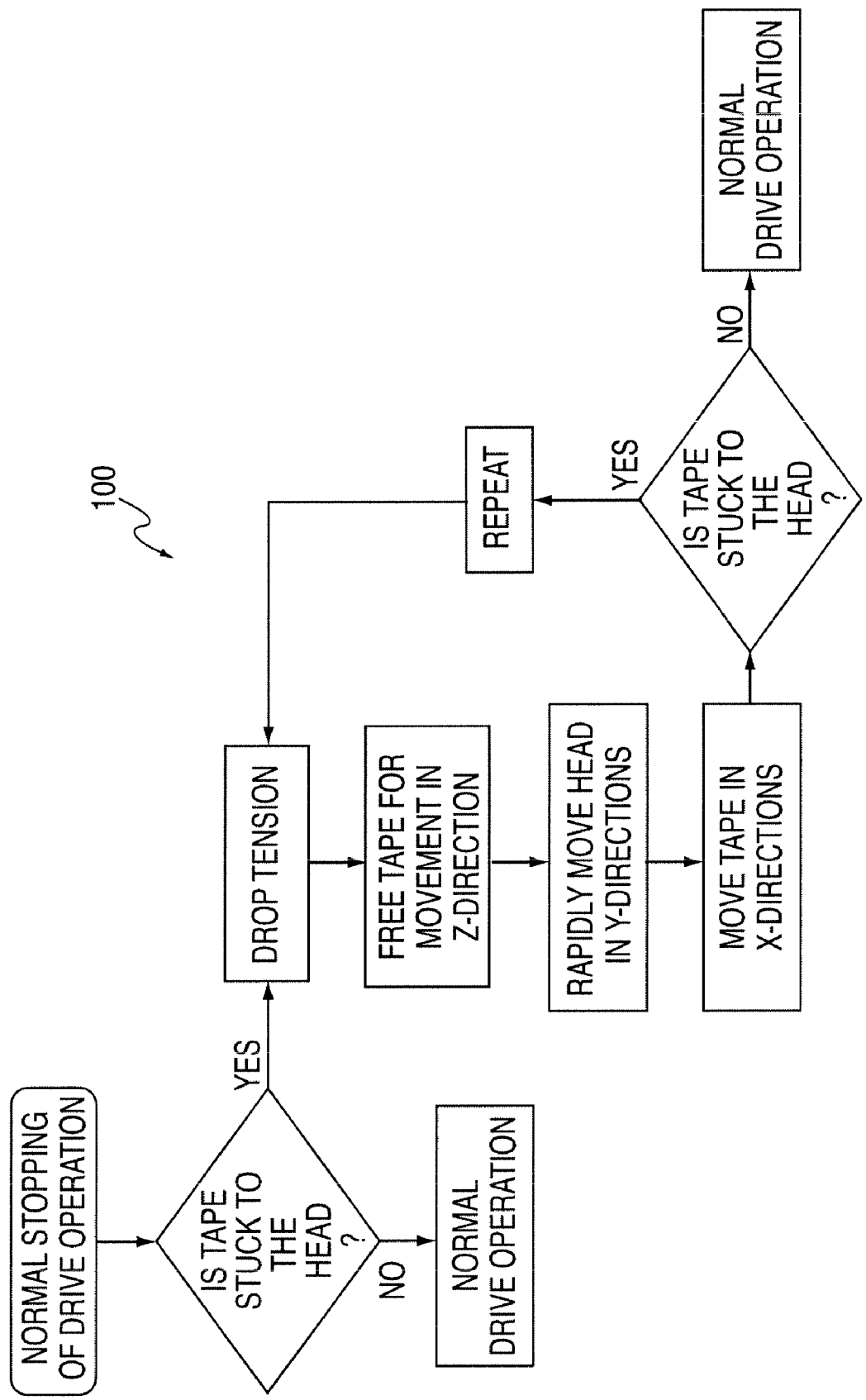
FIG. 3 is a flow chart illustrating a method for reducing occurrences of tape stick conditions in magnetic tape.

Typically, drives experience two general conditions; operating conditions and stop conditions. Operating conditions include functional rotation of the reels 12a-b, in which at least one of the reels 12a-b are actuated by at least one of the motors 18a-b to achieve multiple, full rotations that facilitate (among other things) tape reading/writing. Stop conditions are the periods of time when the reels 12a-b are not fully rotating in a manner that facilitates tape reading/writing, or other, normal drive functions. Stop conditions last any desired amount of time between operating conditions, and sometimes include a "stop lock mode," in which the tension is lowered while the tape 14 is stopped in place between the reels 12a-b in order to preserve the tape 14, save power, and reduce heat. Whether a "stop lock" mode occurs or not, any possibility that the portion 22 of tape 14 may stick to the head 16 (i.e., a tape stick condition) increases with the duration of a stop condition. Tape stick conditions may be detected in the drive by sensing that excessive force is required to turn the reels 12a-b. If the tape 14 is stuck to the head 16, then the tape 14 will not move. Practical limits pertaining to force required to turn the reels 12a-b are applied to prevent damaging (e.g. stretching) of the tape 14. If a maximum reel turning force is reached (according to these limits) without reel movement, then the tape 14 is most likely stuck to the head. In an exemplary embodiment, actual motion of the reels 12a-b is sensed by sensors (not illustrated) disposed in the reel motors 18a-b. If the portion 22 of tape 14 is detected to be in a stick condition with the head 16, further steps, as are discussed below and illustrated in a process 100 of the flow chart of FIG. 3, may be taken to remove the length of tape 14 from a tape stick condition with the head 16.

The steps (as shown in the process 100) initiated to reduce occurrences of these tape stick conditions may include a dropping of tension in the length of tape 14, a moving of the head 16 in relation to the length of tape 14, and a fractional rotation (as represented by arrows 25a-b in the Figure) of at least one of the reels 12a-b, all may be employed during the stop condition. In an exemplary embodiment, the dropping of tape tension is from full tension to zero tension. In one exemplary embodiment, this may be accomplished by setting the reel motor driving currents to zero. In another exemplary embodiment, the dropping of tension is achieved by setting a digital to analog converter (DAC) value of the motors 18a-b to zero. In still another exemplary embodiment, the dropping of tension in the length of tape between the reels 12a-b is achieved by disabling motor drivers 35a-b associated with the motors 18a-b. This drop of tension relaxes the length of tape 14, allowing air to come between the portion 22 of tape and the head 16 and reducing stick conditions. At full tension, the tape 14 is pulled with a controlled force tight against the head 16. This full tension condition occurs during normal operation of the drive 10. By dropping the tape tension, the pulling force is eliminated and the tape 14 is free to relax and lift away from the head 16 in a z-direction 19 (see FIG. 2). The z-direction 19 runs substantially parallel to a deck 24 of the tape drive 10 and substantially orthogonal to the length of tape 14, and allows the tape 14 to move away from contact with the head 16 in direction 19, reducing tape stick conditions.

Referring again to the process 100, head movement may be perpendicular to the length of tape 14 in y-directions 45 (see FIG. 2). Movement in the y-directions is rapid and relatively vertical (i.e., substantially toward and away from the deck 24 of the tape drive 10 in a direction substantially orthogonal to the length of tape 14). This movement physically separates the portion 22 of tape 14 from the head 16, further reducing stick conditions. In an exemplary embodiment movement in the y-directions may be actuated via a head actuator assembly 21, wherein the head 16 is mounted on an actuator 23 affixed to the deck 24 of the drive 10. The actuator itself may be a linear motion VCM (Voice Coil Motor) that would move in one direction (for example, relatively upward) if a positive current were applied, and in another direction (for example, relatively downward) if a negative current were applied. The head 16 may be moved up and down repeatedly to dislodge a sticking tape 14 from contact with the head 16.

With further reference to the process 100, the fractional rotation (a fractional rotation of a reel rotation) mentioned above includes fractionally rotating (a rotation represented by arrow 25a) the supply reel 12a while maintaining zero current in the take-up reel 12b. This fractional rotation 25a moves the portion 22 of tape in an x-direction 26a, further inducing separation of the portion 22 of tape from the head 16. In an exemplary embodiment, the fractional rotation mentioned above also includes fractionally rotating (a rotation represented by arrow 25b) the take-up reel 12b while maintaining zero current in the supply reel 12a. This fractional rotation 25b follows the rotation 25a (after a brief, pre-determined period of time), and moves the portion 22 of tape also in an opposite x-direction 26b, still further inducing separation of the portion 22 of tape from the head 16. These movements in the x-directions 26a-b allow the portion 22 to move in a "shoe-shine" fashion in relation to the head 16, while the length of tape 14 is under the zero tension conditions discussed above. It should be appreciated that the movements in the x-directions 26a-b may occur simultaneously with movement of the head 16 in the y-directions 45.

In an exemplary embodiment, these fractional rotations 25a-b are about $\frac{1}{8}^{th}$ of a full rotation of each of the reels 12a-b. Actuation of the fractional rotations 25a-b of the reels 12a-b may be achieved via any means desired, including internal motor controls, and/or an increased current to the motor(s) 18a-b associated with the actively rotating reel(s) 12a-b. It is noteworthy that if the reels 12a-b will not move in response to actuation, then the portion 22 of tape 14 remains stuck to the head 16 and further recovery actions may be necessary, such as repeating the process 100. In an exemplary embodiment, if the process 100 is repeated a pre-determined number of times, repetition of the process 100 may cease, and a non recoverable error indication may be displayed at a computing resource (not illustrated) logically associated with the reel-to-reel tape drive 10.

While the invention has been described with reference to an exemplary embodiment, it should be understood by those skilled in the art that various changes may be made and equivalents may be substituted for elements thereof without departing from the scope of the invention. In addition, many modifications may be made to adapt a particular situation or substance to the teachings of the invention without departing from the scope thereof. Therefore, it is important that the invention not be limited to the particular embodiment disclosed as the best mode contemplated for carrying out this invention, but that the invention will include all embodiments falling within the scope of the apportioned claims. Moreover, unless specifically stated any use of the terms first, second, etc. do not denote any order or importance, but rather the terms first, second, etc. are used to distinguish one element from another.

What is claimed is:

1. A method for reducing occurrences of tape stick conditions in magnetic tape, the method comprising:

stopping functional rotation of each of a bi-directionally rotatable supply reel and a bi-directionally rotatable take-up reel of a reel-to-reel tape drive that includes a length of magnetic tape at least partially wound around each of said reels, a portion of said length of tape extending between said reels and contacting a head positioned between said reels, wherein said stopping creates a stop condition in said tape drive;

determining if said length of tape is stuck to said head;

dropping tension in said portion of said length of tape extending between said reels from full tension to zero tension;

freeing said length of tape for movement in a z-direction relative to said head via said dropping tension, said z-direction running substantially parallel to a deck of said tape drive and substantially orthogonal to said length of tape;

moving said head in y-directions relative to said length of tape wherein said y-directions includes movement substantially toward and away from said deck of said tape drive;

moving said length of tape in an x-direction relative to said head via a rotation of said bi-directionally rotatable supply reel a fraction of a reel rotation during said stop condition; and causing said portion of said length of tape to at least temporarily break contact with said head via at least one of said dropping, said moving of said length of tape in said z-direction, said moving of said length of tape in said x-direction, and said moving of said head in said y-directions.

2. The method of claim 1, further including waiting a pre-determined period of time after said rotation of said bi-directionally rotatable supply reel, moving said length of tape in an opposite x-direction relative to said head via a rotation of said bi-directionally rotatable take-up reel a fraction of a reel rotation during said stop condition.

3. The method of claim 2, further including alternatingly repeating said rotation of said bi-directionally rotatable supply reel and said rotation of said bi-directionally rotatable take-up reel after said pre-determined period of time.

4. The method of claim 2, wherein said actuating of said rotation of said reels is accomplished by increasing an electrical current to a motor associated with said rotatable reel.

5. The method of claim 4, wherein said fraction is about $1/8^{th}$ of a full rotation.

6. The method of claim 2, further including setting digital to analog converter (DAC) values of a motor associated with each of said reels to zero, said setting causing said dropping of tension in said length of tape extending between said reels.

7. The method of claim 2, further including disabling a motor driver of a motor associated with each of said reels to zero, said setting causing said dropping of tension in said length of tape extending between said reels.

8. A method for reducing occurrences of tape stick conditions in magnetic tape, the method comprising:

stopping functional rotation of each of a bi-directionally rotatable supply reel and a bi-directionally rotatable take-up reel of a reel-to-reel tape drive that includes a length of magnetic tape at least partially wound around each of said reels, a portion of said length of tape extending between said reels and contacting a head positioned between said reels, wherein said stopping creates a stop condition in said tape drive;

determining if said length of tape is stuck to said head;

dropping tension in said length of tape extending between said reels from full tension to zero tension;

freeing said length of tape for movement in a z-direction relative to head, said z-direction running substantially parallel to a deck of said tape drive and substantially orthogonal to said length of tape;

moving said head in y-directions relative to said length of tape wherein said y-directions includes movement substantially toward and away from said deck of said tape drive; and moving said length of tape in an x-direction relative to said head via a rotation of said bi-directionally rotatable supply reel a fraction of a reel rotation during said stop condition; and re-determining if said length of tape is stuck to said head.

9. The method of claim 8, further including waiting a pre-determined period of time after said rotation of said bi-directionally rotatable supply reel, moving said length of tape in an opposite x-direction relative to said head via a rotation of said bi-directionally rotatable take-up reel a fraction of a reel rotation during said stop condition.

10. The method of claim 9, further including alternatingly repeating said rotation of said bi-directionally rotatable supply reel and said rotation of said bi-directionally rotatable take-up reel after said pre-determined period of time.

11. The method of claim 10, wherein said actuating of said rotation of said reels is accomplished by increasing an electrical current to a motor associated with said rotatable reel.

12. The method of claim 11, wherein said fraction is about $1/8^{th}$ of a full rotation.

13. The method of claim 9, further including setting digital to analog converter (DAC) values of a motor associated with each of said reels to zero, said setting causing said dropping of tension in said length of tape extending between said reels.

14. The method of claim 9, further including disabling a motor driver of a motor associated with each of said reels to zero, said setting causing said dropping of tension in said length of tape extending between said reels.

15. The method of claim 9, further including repeating said tension dropping, said moving said length of tape in said z-direction, said moving said length of tape in said x-direction, and said moving of said head in said y-directions until said length of tape at least temporarily breaks contact with said head.

16. The method of claim 9, further including repeating said dropping of tension, said moving said length of tape in said z-direction, and said moving said length of tape in said x-direction, and said moving of said head in said y-directions a pre-determined number of times, and displaying a non recoverable error indication at a computing resource logically associated with said reel-to-reel tape drive.

17. The method of claim 8, wherein said rapidly moving said head in relation to said length of tape includes directionally moving said head substantially toward and away from said deck of said tape drive in a direction substantially orthogonal to said length of tape.

18. A method for reducing occurrences of tape stick conditions in magnetic tape, the method comprising:

stopping functional rotation of each of a bi-directionally rotatable supply reel and a bi-directionally rotatable take-up reel of a reel-to-reel tape drive that includes a length of magnetic tape at least partially wound around each of said reels, a portion of said length of tape extending between said reels and contacting a head positioned between said reels, wherein said stopping creates a stop condition in said tape drive;

determining if said length of tape is stuck to said head;

dropping tension in said length of tape extending between said reels from full tension to zero tension;

freeing said length of tape for movement in a z-direction relative to said head via said dropping tension, said z-direction running substantially parallel to a deck of said tape drive and substantially orthogonal to said length of tape;

moving said head in y-directions relative to said length of tape wherein said y-directions includes movement substantially toward and away from said deck of said tape drive;

moving said length of tape in an x-direction relative to said head via a rotation of said bi-directionally rotatable supply reel a fraction of a reel rotation during said stop condition, wherein said moving in said y-directions and said moving in said x-direction is simultaneous; and causing said portion of said length of tape to at least temporarily break contact with said head via at least one of said tension dropping, said moving of said length of tape in said z-direction, said moving said length of tape in said x-direction, and said moving of said head in said y-directions.

19. The method of claim 18, further including waiting a pre-determined period of time after said rotation of said bi-directionally rotatable supply reel, moving said length of tape in an opposite x-direction relative to said head via a rotation of said bi-directionally rotatable take-up reel a fraction of a reel rotation during said stop condition.

* * * * *